(12) United States Patent
Patodia et al.

(10) Patent No.: US 12,086,626 B2
(45) Date of Patent: Sep. 10, 2024

(54) AUTOMATED TUNING OF DATA PROCESSING RULES BASED ON REGION-SPECIFIC REQUIREMENTS

(71) Applicant: PAYPAL, INC., San Jose, CA (US)

(72) Inventors: Prabin Patodia, Bangalore (IN); Sumit Kumar, Bangalore (IN)

(73) Assignee: PAYPAL, INC., San Jose, CA (US)

( * ) Notice: Subject to any disclaimer, the term of this patent is extended or adjusted under 35 U.S.C. 154(b) by 456 days.

(21) Appl. No.: 17/544,778

(22) Filed: Dec. 7, 2021

(65) Prior Publication Data

US 2023/0176896 A1 Jun. 8, 2023

(51) Int. Cl.
G06F 9/46 (2006.01)
G06Q 20/40 (2012.01)

(52) U.S. Cl.
CPC ........... *G06F 9/466* (2013.01); *G06Q 20/405* (2013.01)

(58) Field of Classification Search
CPC ...... G06F 9/466; G06Q 20/405; G06Q 50/18; G06Q 10/10
See application file for complete search history.

(56) References Cited

U.S. PATENT DOCUMENTS

2022/0207241 A1* 6/2022 Bettencourt-Silva ... G06F 40/30
2023/0104129 A1* 4/2023 Miriyala ............. H04L 63/0263
709/220

\* cited by examiner

*Primary Examiner* — Sisley N Kim
(74) *Attorney, Agent, or Firm* — Haynes and Boone, LLP (70481)

(57) ABSTRACT

There are provided systems and methods for automated tuning of data processing rules based on region-specific requirements. A service provider, such as an electronic transaction processor for digital transactions, may utilize different decision services that implement rules for decision-making of data including real-time data in production computing environments. Rules may correspond to coded statements that perform an automated decision-making service for the computing services and platforms of the service provider. When writing rules, different variables and conditions may be utilized, where each variable and condition may cause a rule output or action. However, conditions and other components of rules may be different for different regions and thus, regional policies may have requirements for rules. The service provider may determine the regional policies when a rule is to be deployed in a region. Thereafter, the service provider may adjust rules specifically for each region.

20 Claims, 5 Drawing Sheets

AUTOMATED TUNING OF DATA PROCESSING RULES BASED ON REGION-SPECIFIC REQUIREMENTS

TECHNICAL FIELD

The present application generally relates to adjusting data processing rules based on region-specific requirements and more particularly to determining policies for region-specific guidelines and requirements for data processing rules when tuning the rules and rule strategies applied to different regions.

BACKGROUND

Users may utilize computing devices to access online domains and platforms to perform various computing operations and view available data. Generally, these operations are provided by different service providers, which may provide services for account establishment and access, messaging and communications, electronic transaction processing, and other types of available services. During use of these computing services, processing platforms, and services, the service provider may utilize one or more decision services that implement and utilize rules for decision-making in real-time data processing, such as within a production computing environment. For example, a data processing rule may correspond to an expression or argument written in computing code and executable processes that allow for processing data and determining a decision. Rules may be constructed by one or more users or other rule authoring entities. These rules may be written for processing in order to provide an output determination and may utilize different operations for fetching and processing data. However, different regions may have different constraints, requirements, and/or guidelines. When applying a rule from one or more regions or a global rule, rule authors may have difficulty keeping track of the requirements and guidelines for different regions. Thus, rules may not be adjusted, optimized, and/or viable in certain regions, which causes errors during rule construction and unnecessarily consume processing resources and time in order to rectify rule construction errors for one or more particular regions.

Figure 1:
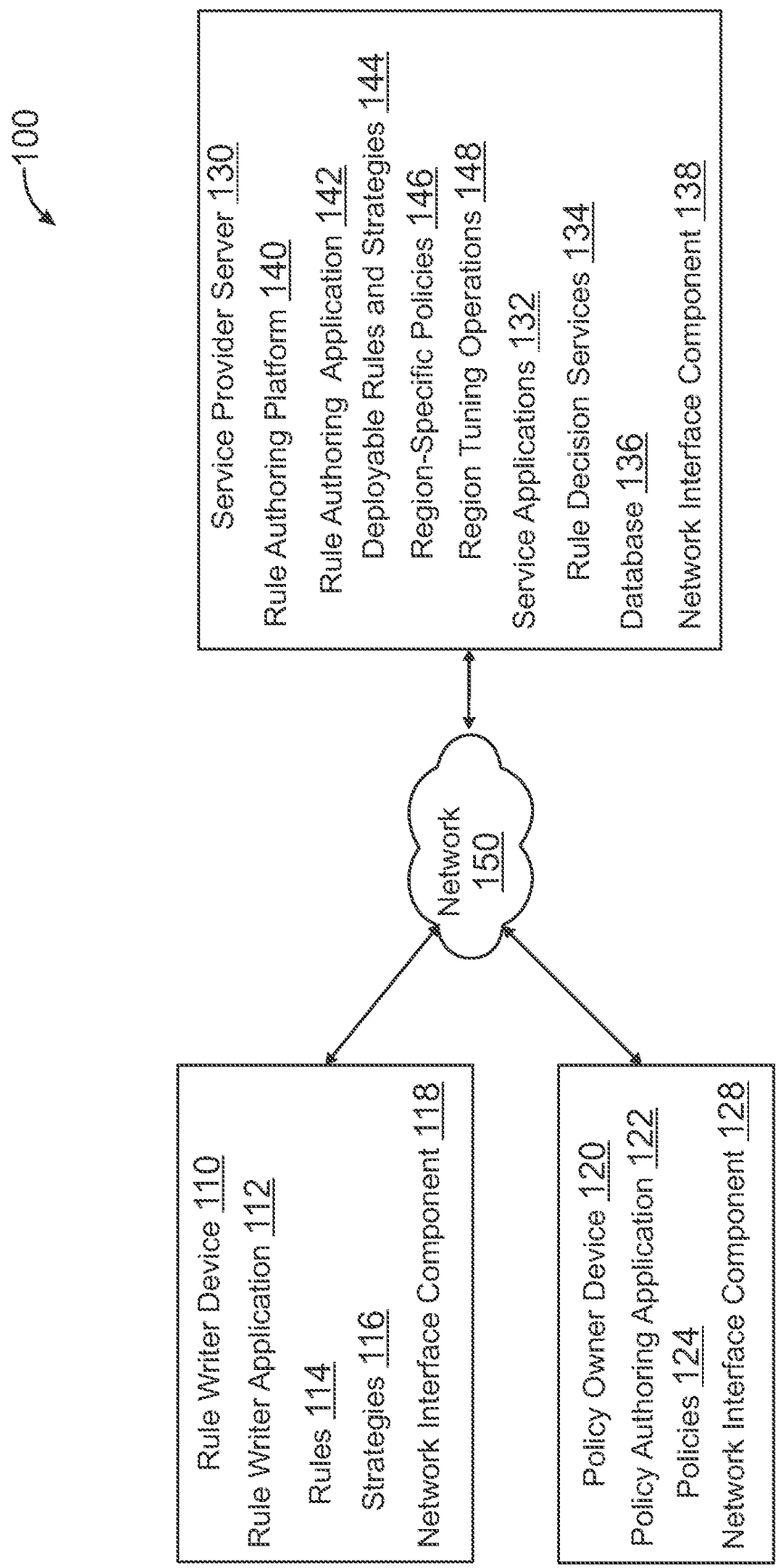
FIG. 1 is a block diagram of a networked system suitable for implementing the processes described herein, according to an embodiment.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

Provided are methods utilized for automated tuning of data processing rules based on a region for a transaction, such as specific requirements, guidelines, best practices, or other factors specific to the region. Systems suitable for practicing methods of the present disclosure are also provided.

A service provider may provide different computing resources and services to users through different websites, resident applications (e.g., which may reside locally on a computing device), and/or other online platforms. When utilizing the services of a particular service provider, the service provider may provide decision services for implementing rules and intelligent decision-making operations with such services. For example, an online transaction processor may provide services associated with electronic transaction processing, including account services, user authentication and verification, digital payments, risk analysis and compliance, and the like. These services may further implement automated and intelligent decision-making operations and engines, including data processing rule engines that automate certain decision-making based on rules and rule strategies (e.g., packages that may include multiple rules working together, in order, or the like for a decision). These decision services may be used for authentication, risk analysis, fraud detection, and the like to determine if, when, and how a particular service may be provided to users. For example, risk rules may be utilized by a risk engine to determine whether electronic transaction processing of a requested digital transaction may proceed or be approved. The risk engine may therefore determine whether to proceed with processing the transaction or decline the transaction (as well as additional operations, such as request further authentication and/or information for better risk analysis).

Global and/or base rules and/or rule strategies may include one or more rules (e.g., as a rules data package) for proliferation over different regions serviced by a service provider, such as the regions where the service provider offers computing resources and services to end users and entities. Each region may have one or more region-specific policies that include the guidelines and/or requirements for rule authoring and execution in different regions, which affects deployment of rules and/or rule strategies in different regions. If global/base strategies need to be applied to multiple regions with possible tuning and/or modifications, this process may take a large amount of human effort and/or time to enable these strategies to each specific region based on these region-specific policies. Conventionally, these efforts are manual and therefore rule writers may be required to manually keep a track of region-specific policies for different regions, as well as specific changes to those over time. This may take considerable time, and errors may be introduced where new rules and rule strategies are not properly written and/or are not compatible with region-specific policies.

Further, policy release managers and/or reviewers for these individual rules and/or strategies may interact with hundreds of individual rule writers in order to consolidate region specific rules into strategies. These region-specific rules may be based on the global/base strategies and/or individual rules for the service provider. Rule writers may clone the base strategies to a specific test computing environment (e.g., not a production computing environment but one where testing of rules may be performed including with use of production data) and begin to make changes to the rules in order to make the rules compatible with the specific region and that region's guidelines, best practices, and requirements. Once the rule changes are done and completed, end-to-end (E2E) testing may be performed on the strategy, which requires collaboration between teams including platform, domain, region-specific managers, and the like. After testing is completed, applicable region-specific strategies may then be propagated with a manual trigger to a region-specific rule repository. However, this operation is not automatic, requires manual efforts and input, and may span a considerable amount of time. Further, there may be a significant chance to miss out on any critical changes for the specific region, which introduces additional error.

To address this problem, the service provider may provide grid computation modules, applications, and/or operations where rules and/or rule strategies may be tuned, adjusted, and/or optimized on a per region basis. For example, different computing systems and architectures in different regions may provide computing services to users. These computing services may utilize decision services for intelligent decision-making, where the decision services include rules written using a rule vocabulary that includes variables and conditions for those variables. Each newly constructed rule using a rule authoring application may include one or more variables associated with data objects that may be used to author a rule. A variable may therefore be considered an expression, constant, or the like, such as one or more business terms for a business rule. A variable's data object therefore fetches, retrieves, and/or loads particular data (e.g., one or more pieces of account data, device data, user data, transaction data). Thus, a variable may correspond to a piece or portion of data for processing, which may correspond to a data object that obtains specific data from a certain resource.

Further, a variable may be affected by a condition or predicate for that variable. A condition may determine when a rule action is carried out, such as declining or allowing authentication, electronic transaction processing, or the like. For example, a condition may analyze data for a variable to determine if the data complies with a particular condition (e.g., a value under or over a threshold, a particular type or value of the data, a true/false data result, a test for data existence, etc.). With business rules, the condition may compare business terms and values. Conditions or predicates may also be associated with condition or predicate types that identify how the condition affects the rule from the data object of the variable. Thereafter, a rule may be implemented and/or deployed to the decision services of the service provider for intelligent decision-making.

Each variable may have a different operation to retrieve data and load the data in the rule, such as by obtaining the data for a local short-term cache, a database system, user input, and the like, as well as the operations to load the data to the rule. The conditions may then affect rule output or actions based on the data for the condition. In order to provide faster, real-time and flexible rule deployment in different regions, the deployable rule is broken into semantics and applicable policies for that region are scanned. This allows the deployable rule to be detected and tuned for a specific region. There are various regions which have their strategies independently evolving based on policies set by policy writers for the region. In order to tune rules and/or strategies for particular regions, an applicable change in one region's strategy will trigger the following operations that use a grid-based computation to tune those rules/strategies based on the region's policies.

The operations may include first filtering the new strategy package (e.g., the one or more rules in the strategy) to identify newly added changes for the regions based on the strategies. This may include parsing the rules and/or rule strategy package using a semantic language processor to extract and/or identify the variables in the rules and the conditions for the rules. Once those are identified, any newly added changes (e.g., not existing rules and/or rule strategies) may be identified in the data packages. These newly added changes may include new rules and/or newly modified rules (e.g., rules that may be based on and/or similar to existing rules). The semantics of the rules that may be parsed, identified, and/or extracted by the semantic language processor may include the variables in the rules, the rule condition/predicate types for those variables, and the rule conditions/predicates, as well as any rule action that may be taken.

For example, each variable and/or condition may include a corresponding identifier, language, and/or description, which may define the data for the variable and/or the function or operation to perform based on that variable's data. The language of the rule may be parsed in order to correlate different terms, identifiers, phrases, and the like for variables and/or conditions. For example, a natural language processor, machine learning (ML) model-based engine, or other artificial intelligence (AI) system may be used to parse, identify, and/or extract different terms, phrases, functions, data objects, operations, and the like in the rules and/or rule strategies. An AI system may be trained in order to parse and determine semantics for the rule(s) and add the semantics to one or more data tables that include columns for regions, variables, rule condition types, rule conditions, and/or rule actions. Rows may include specific rules having variables and/or conditions, or may correspond to each variable and its rule condition/predicate type with the corresponding condition/predicate. Thus, the semantic processor may scan an input strategy and build a smart semantic output data structure. The data structure may then be used by a tuning processor to filter and tune region-specific strategies from the global and/or deployable strategy. Further, an administrator or other vocabulary writer may also provide correlations and a mapping of semantics in a rule to those columns.

The service provider may further utilize the grid computation module to identify regions with the data processing rules and/or rule strategies need to be applied. These regions may be the selected and/or designated regions for deployment of a rule and/or rule strategy (e.g., combination of rules) from another region. For example, a global rule strategy may be made, which may then be applied to multiple regions (e.g., India, China, European Union, etc.). Other regions may have rules and/or strategies initially deployed (e.g., US or North America), which may then be applied to other regions. In such examples, the rules and/or strategies may be deployed in main regions for a company or may be initially tested in a specific region for deployment in other regions. Once one or more regions are identified, region-specific policies for those region(s) are determine in order to compute and tune the rules and/or rule strategies each region's guidelines/best practices/requirements as set in the region's policies by policy writers.

For example, policy writers may set specific policies for a region. Region-specific policies may include guidelines and/or require in a policy/compliance repository (e.g., a database system or data store), which may initially be setup by region-specific policy owners. Policy owners may continue to update the new guidelines and provide latest updates of policies for a specific region. Policies may include their own configurations for rule variables, conditions, condition types, and/or actions, however, not all components need to be present. For example, a condition and/or condition type may only need to be present so that when a variable having that condition and condition type is detected, that variable's rule may be tuned with the policy's condition and/or condition type.

Thereafter, a policy tuning orchestrator may tune region-specific rules and/or strategies using the policy data structures and the output sematic processor data structure. Using the data structure from the smart semantic processor output with the region-specific guidelines, target policies may be tuned by matching corresponding variables, rule predicate types (e.g., condition types), rule predicates (the corresponding condition), and/or actions to detect the applicable semantics (e.g., variables) and predicates (e.g., conditions) to be changed for each region. Once a region's specific guidelines are found for the combination of variables and rule condition types, target regions may then be filtered and tuned. For each matched target region, region-specific policies may then be processed and tuned by adjusting or changing the corresponding conditions and/or actions for the rule. In order to implement these operations to adjust and tune rules for region-specific policies, the grid computation module may utilize the below function F to tune the strategies in n number of regions, $-F\{Sr\}=\{S\{in\}, V\{r\}, G\{r\}, ctx\}$. In this function, Sr may correspond to region specific strategies, $S\{in\}$ may correspond to input strategies, $V\{r\}$ may correspond to region specific variables and semantics, $G\{r\}$ may correspond to region specific guidelines/requirements for policies, and ctx may correspond to current context of input strategy.

The final computed and adjusted rules and/or strategies are automatically propagated for release and/or execution with decision services for the appropriate region. For example, the region-adjusted rules may be propagated within a rule repository for each corresponding region. Thereafter, the applicable regions each consume and process the newly propagated rules and/or strategies from their region-specific rule repository for use with decision services and/or other rule processing engines. This allows those services and engines to implement the corresponding rules and strategies and receive the benefits and/or results of the strategies in an automated manner without requiring manual tuning of rules. Further, rules and strategies may be tuned for faster time to market (TTM) by providing an automated rule tuning engine and operations for the grid computation module, thereby providing faster benefits with less input and computing resources.

Further, a dynamic update using an AI or ML engine may provide policy updates. Policy guidelines may first be set up by policy owners, which may continue to update new policies on a regular basis. However, the policy tuning module may also provide inputs to the region-specific policies in a dynamic manner using this intelligent engine. Whenever a rule is processed by the smart semantic processor and then tuned by the policy computation, a dynamic update operation may detect new patterns for policies, for example, if no matches are found. Thus, the operations can act as a dynamic input to the policy repository. Based on the historic patterns in the rules and/or strategies, an AI or ML algorithm-based engine may predict region-specific policies, which may also be reviewed by policy owners to validate and confirm. Thus, the following operations may provide automated computation and propagation of region-based strategies. This allows for the automated and faster benefits of newly modified strategies to all applicable regions for those strategies and reduces the frequency of multiple team dependencies (e.g., teams for a domain, platform, and/or policy).

Thereafter, a service provider, such as an online transaction processor may provide services to users, including electronic transaction processing, such as online transaction processors (e.g., PayPal®) that allows merchants, users, and other entities to process transactions, provide payments, and/or transfer funds between these users. When interacting with the service provider, the user may therefore process a particular transaction and transactional data to provide a payment to another user or a third-party for items or services. Moreover, the user may view other digital accounts and/or digital wallet information, including a transaction history and other payment information associated with the user's payment instruments and/or digital wallet. The user may also interact with the service provider to establish an account and other information for the user. In further embodiments, other service providers may also provide computing services, including social networking, microblogging, media sharing, messaging, business and consumer platforms, etc. These computing services may be deployed across multiple different applications including different applications for different operating systems and/or device types. Furthermore, these services may utilize the aforementioned decision services having the rules optimized for regions based on policies set for those regions.

In various embodiments, in order to utilize the computing services of a service provider, an account with a service provider may be established by providing account details, such as a login, password (or other authentication credential, such as a biometric fingerprint, retinal scan, etc.), and other account creation details. The account creation details may include identification information to establish the account, such as personal information for a user, business or merchant information for an entity, or other types of identification information including a name, address, and/or other information. The user may also be required to provide financial information, including payment card (e.g., credit/debit card) information, bank account information, gift card information, benefits/incentives, and/or financial investments, which may be used to process transactions after identity confirmation, as well as purchase or subscribe to services of the service provider. The online payment provider may provide digital wallet services, which may offer financial services to send, store, and receive money, process financial instruments, and/or provide transaction histories, including tokenization of digital wallet data for transaction processing. The application or website of the service provider, such as PayPal® or other online payment provider, may provide payments and the other transaction processing services. Access and use of these accounts may be performed in conjunction with uses of the aforementioned decision services having rules and strategies deployed in a region-specific manner discussed herein.

FIG. 1 is a block diagram of a networked system 100 suitable for implementing the processes described herein, according to an embodiment. As shown, system 100 may comprise or implement a plurality of devices, servers, and/or software components that operate to perform various methodologies in accordance with the described embodiments. Exemplary devices and servers may include device, stand-alone, and enterprise-class servers, operating an OS such as a MICROSOFT® OS, a UNIX® OS, a LINUX® OS, or another suitable device and/or server-based OS. It can be appreciated that the devices and/or servers illustrated in FIG. 1 may be deployed in other ways and that the operations performed, and/or the services provided by such devices and/or servers may be combined or separated for a given embodiment and may be performed by a greater number or fewer number of devices and/or servers. One or more devices and/or servers may be operated and/or maintained by the same or different entity.

System 100 includes a rule writer device 110, a policy owner device 120, and a service provider server 130 in communication over a network 150. Rule writer device 110 may be utilized by a user to access a computing service or resource provided by service provider server 130, where service provider server 130 may provide various data, operations, and other functions to rule writer device 110 via network 150 including those associated with rule authoring and deployment of rules for use with different regions. In this regard, rule writer device 110 may be used to access a rule authoring application that allows construction of rules and rule strategies. Service provider server 130 may further provide policy owner device 120 various data, operations, and other functions for policy construction and setting of guidelines and requirements for certain regions. Thereafter, service provider server 130 may adjust rules and/or rule strategies for deployment in different regions based on those policies.

Rule writer device 110, policy owner device 120, and service provider server 130 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 100, and/or accessible over network 150.

Rule writer device 110 may be implemented as a communication device that may utilize appropriate hardware and software configured for wired and/or wireless communication with policy owner device 120, service provider server 130, and/or other devices or servers. For example, in one embodiment, rule writer device 110 may be implemented as a personal computer (PC), a smart phone, laptop/tablet computer, wristwatch with appropriate computer hardware resources, eyeglasses with appropriate computer hardware (e.g., GOOGLE GLASS®), other type of wearable computing device, implantable communication devices, and/or other types of computing devices capable of transmitting and/or receiving data. Although only one device is shown, a plurality of devices may function similarly and/or be connected to provide the functionalities described herein.

Rule writer device 110 of FIG. 1 contains a rule writer application 112, a database, and a network interface component 118. Rule writer application 112 may correspond to executable processes, procedures, and/or applications with associated hardware. In other embodiments, rule writer device 110 may include additional or different modules having specialized hardware and/or software as required.

Rule writer application 112 may correspond to one or more processes to execute software modules and associated components of rule writer device 110 to provide features, services, and other operations for writing and constructing rules for service provider server 130 using variables and conditions used by decision services and other computing systems associated with service provider server 130. In this regard, rule writer application 112 may correspond to specialized hardware and/or software utilized by a user (e.g., a rule writer) of rule writer device 110 that may be used to access a website or UI provided by service provider server 130. Rule writer application 112 may utilize one or more UIs, such as graphical user interfaces presented using an output display device of rule writer device 110, to enable the user associated with rule writer device 110 to enter and/or view data, navigate between different data, UIs, and executable processes, and request processing operations for rule authoring provided by service provider server 130. In some embodiments, the UIs may display and/or allow input of variables, conditions or predicates, condition or predicate types, and/or rule actions. In order to do this, rule writer application 112 may render a UI during application execution, which may correspond to a webpage, domain, service, and/or platform provided by service provider server 130.

In some embodiments, rules 114 and/or strategies 116 constructed using rule writer application 112 may include rules for decision-making used in electronic transaction processing provided by service provider server 130. For example, rules 114 and/or strategies 116 may correspond to those implemented in one or more regions or domains, which may utilize rules 114 and/or strategies 116 during decision-making. Thus, rules 114 and/or strategies 116 may be implemented in one or more decisions services, rules-based engines, or other computing systems that provide intelligent decision-making. Different services may be provided that utilize rules constructed using rule writer application 112, including those services associated with electronic transaction processing, messaging, social networking, media posting or sharing, microblogging, data browsing and searching, online shopping, and other services available through online service providers.

Rule writer application 112 may display one or more operations for construction of rules 114 and/or strategies 116, which may utilize variables, conditions, and other components provided in rule writer application 112 and used to generate rules 114 and/or strategies 116. When constructing rules, rule writer application 112 may further display region-specific policies for constructing rules 114 and/or strategies 116. When adjusting rules 114 and/or strategies 116 for region-specific policies, rule writer application 112 may also provide and/or present adjustments, changes, and/or optimizations of rules 114 and/or strategies 116 based on those region-specific policies. However, such display may not be included and instead may be provided by service provider server 130 when configuring rules 114 and/or strategies 116 for region-specific policies, as discussed herein.

Rule writer device 110 may further include a database stored on a transitory and/or non-transitory memory of rule writer device 110, which may store various applications and data and be utilized during execution of various modules of rule writer device 110. The database may include, for example, identifiers such as operating system registry entries, cookies associated with rule writer application 112 and/or other applications, identifiers associated with hardware of rule writer device 110, or other appropriate identifiers, such as identifiers used for payment/user/device authentication or identification, which may be communicated as identifying the user/rule writer device 110 to service provider server 130. Moreover, the database may include information for writing and constructing rules 114 and/or strategies 116, such as data that may be displayed through one or more user interfaces that allow selection and viewing of different variables and conditions used in rule construction.

Rule writer device 110 includes at least one network interface component 118 adapted to communicate with rule writer device 110, service provider server 130, and/or other devices or servers over network 150. In various embodiments, network interface component 118 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices.

Policy owner device 120 may be implemented as a communication device that may utilize appropriate hardware and software configured for wired and/or wireless communication with rule writer device 110, service provider server 130, and/or other devices or servers. For example, in one embodiment, policy owner device 120 may be implemented as a personal computer (PC), a smart phone, laptop/tablet computer, wristwatch with appropriate computer hardware resources, eyeglasses with appropriate computer hardware (e.g., GOOGLE GLASS®), other type of wearable computing device, implantable communication devices, and/or other types of computing devices capable of transmitting and/or receiving data. Although only one device is shown, a plurality of devices may function similarly and/or be connected to provide the functionalities described herein.

Policy owner device 120 of FIG. 1 contains a policy authoring application 122, a database, and a network interface component 128. Policy authoring application 122 may correspond to executable processes, procedures, and/or applications with associated hardware. In other embodiments, policy owner device 120 may include additional or different modules having specialized hardware and/or software as required.

Policy authoring application 122 may correspond to one or more processes to execute software modules and associated components of policy owner device 120 to provide features, services, and other operations for providing policies 124 of guidelines and requirements for rules 114 and/or strategies 116 used by decision services and other computing systems associated with service provider server 130. In this regard, policy authoring application 122 may correspond to specialized hardware and/or software utilized by a user (e.g., a policy owner, writer, or configured for one or more regions, which may include a global region) of policy owner device 120 that may be used to access a website or UI provided by service provider server 130. Policy authoring application 122 may utilize one or more UIs, such as graphical user interfaces presented using an output display device of policy owner device 120, to enable the user associated with policy owner device 120 to enter and/or view data, navigate between different data, UIs, and executable processes, and request processing operations for policy creation provided by service provider server 130. In some embodiments, the UIs may display and/or allow creation of policies that include guidelines and/or requirements affecting variables, conditions or predicates, condition or predicate types, and/or rule actions for rules 114 and/or strategies 116. In order to do this, policy authoring application 122 may render a UI during application execution, which may correspond to a webpage, domain, service, and/or platform provided by service provider server 130.

In some embodiments, policies 124 generated by, provided by, and/or constructed using policy authoring application 122 may include specifications, limits, ranges, thresholds, constraints, or settings for various components of rules 114 and/or strategies 116. As previously discussed, rules 114 and/or strategies 116 may correspond to those implemented in one or more regions or domains, which may utilize rules 114 and/or strategies 116 during decision-making. Thus, policies 124 may include configurations set up by a policy owner or other entity that establishes, maintains, and/or controls the policies for guidelines and requirements of rules, rule strategies, and other decision-making for one or more regions. Policies 124 may be set based on risk, compliance, laws, regulations, mandates, and/or business rules of the particular region(s) and may be used to set particular configurations for conditions or predicates, actions, and the like for rules 114 and/or strategies 116.

Policy authoring application 122 may display one or more operations for input and/or generation of policies 124, which may configure data and settings for variables, conditions, and other components for at least rules 114 and/or strategies 116. When constructing policies, policy authoring application 122 may further display region-specific policies that may be determined by an ML model-based or other AI-based (e.g., a rules-based engine) for determination of policies 124 and/or presentation of suggestions for policies 124. For example, policies 124 may be set up by policy owners and/or updated based on new requirements and guidelines for one or more regions. However, after tuning and/or adjusting one or more of rules 114, strategies 116, and the like, patterns for policy guidelines may be detected for the same or different regions, such as if a policy is not yet set but rules 114 and/or strategies 116 indicate a global applied policy. This may provide dynamic input to a policy guideline repository and/or allow for automated creation of policies 124. Such patterns may be detected by an ML model-based or other AI engine and/or system, such as a trained ML model system utilizing one or more ML model algorithms (e.g., tree-based, linear regression, etc.) to detect and/or predict possible region-specific guidelines and/or requirements for policies 124.

Policy owner device 120 may further include a database stored on a transitory and/or non-transitory memory of policy owner device 120, which may store various applications and data and be utilized during execution of various modules of policy owner device 120. The database may include, for example, identifiers such as operating system registry entries, cookies associated with policy authoring application 122 and/or other applications, identifiers associated with hardware of policy owner device 120, or other appropriate identifiers, such as identifiers used for payment/user/device authentication or identification, which may be communicated as identifying the user/policy owner device 120 to service provider server 130. Moreover, the database may include information for generating policies 124, such as data that may be displayed through one or more user interfaces that present information on guidelines and/or requirements for a region based on one or more laws, regulations, goals, or the like.

Policy owner device 120 includes at least one network interface component 128 adapted to communicate with rule writer device 110, service provider server 130, and/or other devices or servers over network 150. In various embodiments, network interface component 128 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices.

Service provider server 130 may be maintained, for example, by an online service provider, which may provide services that use data processing rules with decision services, decision-making engines, and other computing systems to perform automated decision-making in an intelligent system. In this regard, service provider server 130 includes one or more processing applications which may be configured to interact with rule writer device 110 and policy owner device 120 to generate and deploy rules and/or rule strategies optimized based on region-specific policies for guidelines and/or requirements for one or more regions. In one example, service provider server 130 may be provided by PAYPAL®, Inc. of San Jose, CA, USA. However, in other embodiments, service provider server 130 may be maintained by or include another type of service provider.

Service provider server 130 of FIG. 1 includes a rule authoring platform 140, service applications 132, a database 136, and a network interface component 138. Rule authoring platform 140 and service applications 132 may correspond to executable processes, procedures, and/or applications with associated hardware. In other embodiments, service provider server 130 may include additional or different modules having specialized hardware and/or software as required.

Rule authoring platform 140 may correspond to one or more processes to execute modules and associated specialized hardware of service provider server 130 to provide a platform and framework to generate rules and rule strategies used in decision services, rules-based engines, and the like for one or more applications, services, and/or platforms of service provider server 130. In this regard, rule authoring platform 140 may correspond to specialized hardware and/or software used by service provider server 130 to first receive rules and/or rule strategies as data packages generated by rule writer device 110 when interacting with rule authoring application 142 of rule authoring platform 140. Rule writer device 110 may provide, generate, and/or write rules and/or rule strategies with rule authoring application 142 using rule writer application 112 of rule writer device 110. Rule authoring platform 140 may provide operations via rule authoring application 142 for rule and/or rule strategy writing and generating for variables that correspond to different operations or processes to load data from one or more resources into a rule or coded expression, such as rules 114 and/or strategies 116. Further, rule authoring application 142 may provide operations to associating variables with conditions or predicates, each of which having a condition type or predicate type, and other rule parameters or configurations (e.g., a rule action or result in response to failing to meet or meeting a condition and the like). Rules and/or rule strategies may also be associated with a region of original generation, designated for deployment, and/or for additional deployments.

During rule and/or rule strategy deployment, or at a later time (e.g., when a rule or rule strategy is deployed from a region to one or more other regions), rule authoring application 142 may receive or access deployable rules and strategies 144, such as from a rule repository or other rule data store. Rule authoring application 142 may receive designation of regions for deployment of deployable rules and strategies 144 and adjust, tune, and/or optimize deployable rules and strategies 144 for those regions. In this regard, rule authoring application 142 may utilize a grid computation module, operations, and/or processes to adjust deployable rules and strategies 144 using a function for region tuning operations 148 and region-specific policies 146. The function may take, as input, deployable rules and strategies 144, a semantic parsed and/or extracted semantics from deployable rules and strategies 144 by a smart semantic rule processor (e.g., having variables, condition types, and conditions), and region-specific policies 146.

As output of the function, region tuning operations 148 of rule authoring application 142 may provide region-specific rules and/or rule strategies based on deployable rules and strategies 144. These may correspond to rules and/or rule strategies for decisions services, rule-based engines, and the like that may be persisted and used from a region-specific repository for each region designated for deployment of deployable rules and strategies 144. The region-specific rules and/or rule strategies from deployable rules and strategies 144 may therefore be automatically adjusted for each region of deployment, and therefore each region may quickly or immediately receive the benefits and uses of deployable rules and strategies 144 adjusted for those regions. This allows for faster deployment without or with little manual efforts while reducing user inputs and rule configuration data processing. Systems, diagrams, and operations for performing these region-specific policy adjustments and tuning of rules and rule strategies is discussed in more detail below with regard to FIGS. 2-4.

Service applications 132 may correspond to one or more processes to execute modules and associated specialized hardware of service provider server 130 to process a transaction or provide another service to customers, merchants, and/or other end users and entities of service provider server 130. In some embodiments, service applications 132 may be used by a user associated with a computing device to establish a payment account, as well as a digital wallet, which may be used to process transactions. In various embodiments, financial information may be stored with the account, such as account/card numbers and information that may enable payments, transfers, withdrawals, and/or deposits of funds. A digital token for the account/wallet may be used to send and process payments, for example, through an interface provided by service provider server 130. The payment account may be accessed and/or used through a web browser application and/or dedicated payment application executed by a computing device to engage in computing services provided by service applications 132.

In various embodiments, service applications 132 may be used when navigating to and/or between webpages, applications and/or application interfaces, computing services, digital resources, and the like. For example, via one or more user interfaces, service applications 132 may process a payment and may provide a transaction history to a computing device for transaction authorization, approval, or denial. Such account services, account setup, authentication, electronic transaction processing, and other services of service applications 132 may utilize rule decision services 134, such as for risk analysis, fraud detection, electronic transaction processing and the like. Thus, rule decision services 134 may implement rules and/or rule strategies written by and deployed from rule authoring platform 140, for example, based on deployable rules and strategies 144 adjusted or tuned for region-specific policies 146 using region tuning operations 148. These rules may be adjusted, tuned, and/or optimized by rule authoring platform 140 so that deployable rules and strategies 144 may be persisted to one or more region-specific rule repositories and executed by region-specific ones of rule decision services 134 and/or other rule-based engines and/or systems.

Additionally, service provider server 130 includes database 136. Database 136 may store various identifiers associated with rule writer device 110 and/or policy owner device 120. Database 136 may also store account data, including payment instruments and authentication credentials, as well as transaction processing histories and data for processed transactions. Database 136 may store financial information and tokenization data. Database 136 may further store data necessary for rule authoring platform 140, including deployable rules and strategies 144 and region-specific policies 146, region deployment requests and/or requirements, and/or adjusted, tuned, and/or optimized rules and/or strategies for particular regions.

In various embodiments, service provider server 130 includes at least one network interface component 138 adapted to communicate rule writer device 110, service provider server 130, and/or other devices or servers over network 150. In various embodiments, network interface component 138 may comprise a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency (RF), and infrared (IR) communication devices.

Network 150 may be implemented as a single network or a combination of multiple networks. For example, in various embodiments, network 150 may include the Internet or one or more intranets, landline networks, wireless networks, and/or other appropriate types of networks. Thus, network 150 may correspond to small scale communication networks, such as a private or local area network, or a larger scale network, such as a wide area network or the Internet, accessible by the various components of system 100.

Figure 2:
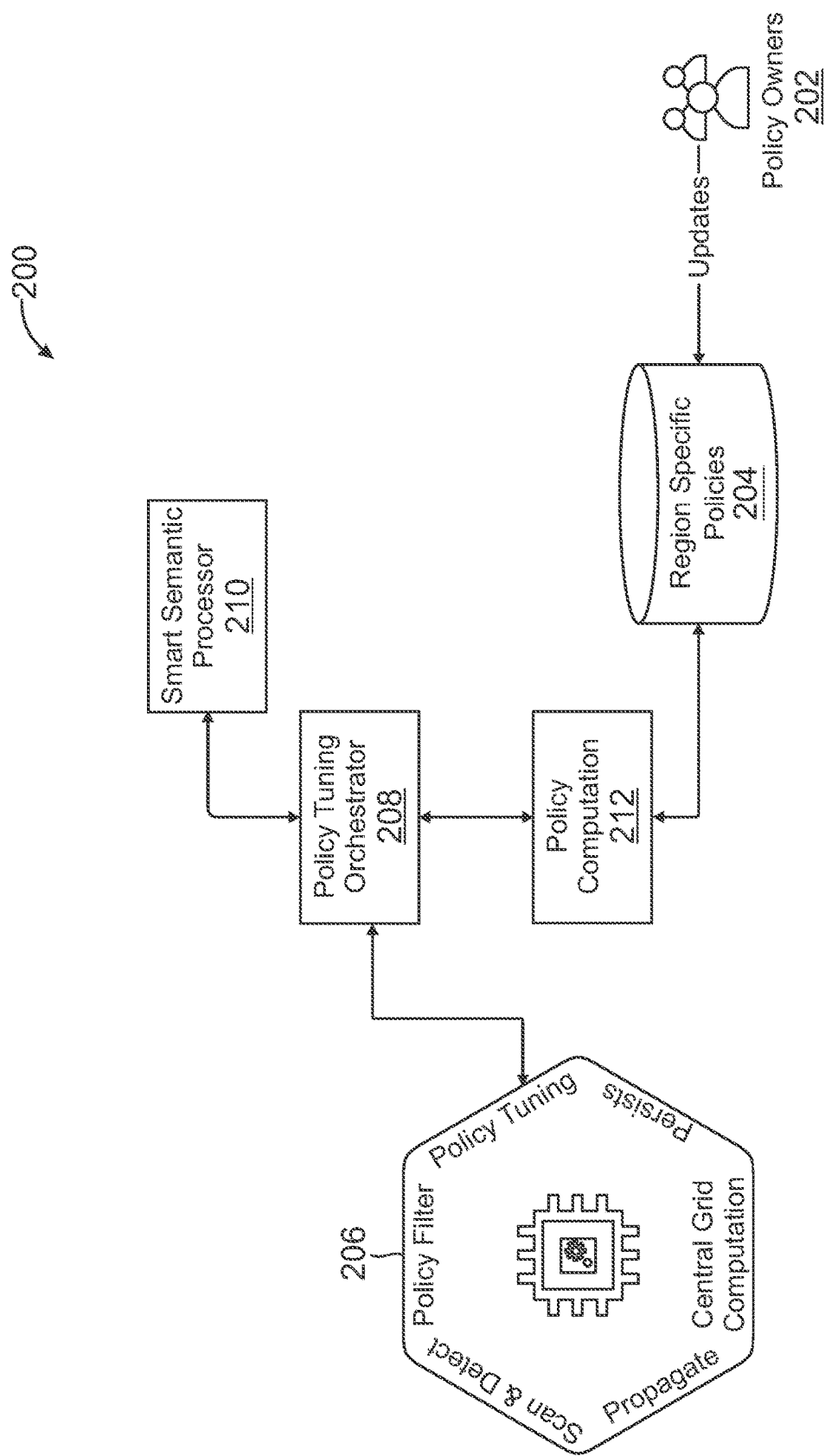
FIG. 2 is an exemplary system environment for automatically tuning data processing rules based on parsed semantics and region-specific policies and requirements, according to an embodiment.

FIG. 2 is an exemplary system environment 200 for automatically tuning data processing rules based on parsed semantics and region-specific policies and requirements, according to an embodiment. System environment 200 of FIG. 2 includes a central grid computation 206 that may be executed by rule authoring platform 140 discussed in reference to system 100 of FIG. 1, such as when adjusting, tuning, and/or optimizing rules and strategies for deployment in new and/or different regions. In this regard, policy owners 202 may utilize a computing device, such as policy owner device 120 in system 100, to establish policies for guidelines and/or requirements for different regions of rule and/or strategy deployment.

In system environment 200, initially policy owners 202 may configure policies that govern regulations, requirements, guidance, and the like for data processing rules, as well as combinations or sequences of those rules for data processing strategies. These rules and rule strategies may be implemented in one or more rule data packages, which include programming language and/or computing code for data processing logic that may be executable by one or more decision services, rule-based engines, or the like. For example, the data processing logic for a rule or rule strategy may be executable to cause a decision service to determine and/or output one or more decisions based on input data. The decision services may therefore provide intelligent decision-making and computing services to users via devices and/or servers. Input data may include data associated with a particular computing service provider to a user where an output decision or score may be provided based on the rules and/or rule strategies. For example, with an online transaction processing service provider, input data may be associated with electronic transaction processing, authentication, risk or fraud assessment or detection, and the like.

Policy owners 202 may provide updates to region-specific policies 204, which may serve as a repository for one or more region-specific policies for guidelines and/or requirements when writing, constructing, and/or deploying rules and/or rule strategies in one or more regions. Region-specific policies 204 may correspond to a singular region or a group of regions that may be included within a same designation (e.g., EU, which may include sub-regions for individual countries but be grouped for certain policies and deployment of rules and strategies). In some embodiments, region-specific policies 204 may also be utilized by multiple regions separately and therefore policies may also be stored to data tables for individual region usage (e.g., with an identifier of column designating the region for a policy). Thus, region-specific policies 204 may correspond to a policy and/or compliance repository, which may be set up by region-specific policy owners 202. Policy owners 202 may further continue to update the new guidelines and/or requirements for policies and provide a latest update of policies for a specific region. A policy may at least designate a condition type and corresponding condition (e.g., setting, configuration, requirement, or the like, such as a threshold amount of a transaction, type of transaction, risk score for the transaction, etc.). The policy may also designate variables that may have that condition, as well as an action to perform for the rule when the condition is complied with, violated, or otherwise met/failed.

Central grid computation 206 may correspond to a platform, processor, or other grid computation module that performs adjustments, tuning, and/or optimization of rules and rule strategies based on policies from region-specific policies 204. Central grid computation 206 may be connected with one or more nodes, processors, and/or models, which central grid computation 206 may operate and utilize during rule and rule strategy tuning. For example, a policy tuning orchestrator 208 may be utilized by the processing unit(s) of central grid computation 206 to orchestrate the processed required for tuning of region-specific strategies. This includes employing smart sematic processor 210 to filter, parse, and/or process rules, strategies, and other rule data packages in order to determine the semantics of those rules. The semantics may include at least variables and conditions for the rules and/or strategies, and may further include condition types, rule actions, and the like.

Smart sematic processor 210 may provide, as an output, a data structure representing the semantics of each rule, including a breakdown for multiple rules and/or variables in a rule strategy. This may be provided to policy tuning orchestrator 208 for use with policy computation 212. For example, policy computation 212 may utilize the data structure from smart sematic processor 210's output with region-specific policies 204 for the particular target region. Target region policies may then be tuned by matching and/or comparing corresponding variables, rule condition types, rule conditions, and/or rule actions. This allows policy computation 212 to detect and determine applicable semantic variable and conditions that may be adjusted, changed, and/or optimized for the target region. Thus, after obtaining one or more of region-specific policies 204 for a region and comparing to the sematic data structure output, the combination of variables and rule condition types may allow for filtering, tuning, and/or changing conditions for that region, as well as any actions that may need adjustment.

For example, when determining changes to one or more rules or rule strategies, central grid computation 206 may utilize the following function with policy tuning orchestrator 208, smart sematic processor 210, and/or policy computation 212:

$$f(Sr)=(S(\text{in}),V(r),G(r),ctx) \qquad \text{Equation 1}$$

n=number of regions.

Sr=region specific strategies.

S(in)=input strategies.

V(r)=region specific variables and semantics.

G(r)=Region specific guidelines/requirements.

ctx=current context of input strategy.

An exemplary rule (or rule strategy package, where the strategy may utilize one rule) may be: "Country is USA; if transaction amount is >$1000; then: decline transaction." USA may be set as the global country or region in such an example. In this scenario, the input data table from a semantic rule processor output of smart semantic processor 210 may appear as follows in Table 1. The input data table for a region-specific policy from region-specific policies 204 may appear as follows in Table 2.

TABLE 1

| Region | Variable | Rule Condition Type | Rule Condition |
|---|---|---|---|
| Global | Transaction amount | Minimum transaction amount limit | Transaction amount > $1000 |

TABLE 2

| Region | Variable | Rule Condition Type | Rule Condition | Action |
|---|---|---|---|---|
| UK | Transaction amount | Minimum transaction amount limit | Transaction amount > £1500 | Decline |
| Global | Transaction amount | Minimum transaction amount limit | Transaction amount > $1000 | Decline |
| China | Transaction amount | Minimum transaction amount limit | Transaction amount > ¥2000 | Decline |
| Global | Transaction type is gambling | Transaction type | Transaction type is gaming is True | Allow |

Only the last row of Table 2 may be ignored when policy computation proceeds with matching between Tables 1 and 2. Thus, an output rule for the region corresponding to the UK may correspond to "Country is UK; if transaction amount is >£1500; then: decline transaction." An output rule for a region corresponding to China may correspond to "Country is China; if transaction amount is >¥2000; then: decline transaction."

Another example may be as follows. An exemplary rule strategy may be: "Country is UK; if (transaction type is gambling is True or ATO model score <500) and transaction amount is <$10000; then: allow transaction." USA may be set as the global country or region in such an example. In this scenario, the input data table from a semantic rule processor output of smart semantic processor 210 may appear as follows in Table 3. The input data table for a region-specific policy from region-specific policies 204 may appear as follows in Table 4.

TABLE 3

| Region | Variable | Rule Condition Type | Rule Condition |
|---|---|---|---|
| Global | Transaction amount | Minimum transaction amount limit | Transaction amount < $10000 |
| Global | Transaction type is gambling | Transaction type | Transaction type is gaming is True |
| Global | ATO model score | Max ATO model score limit | ATO model score < 500 |

TABLE 4

| Region | Variable | Rule Condition Type | Rule Condition | Action |
|---|---|---|---|---|
| India | Transaction amount | Minimum transaction amount limit | Transaction amount < ₹ 50000 | Allow |
| Global | Transaction amount | Minimum transaction amount limit | Transaction amount > $1000 | Decline |
| Global | Transaction type is gambling | Transaction type | Transaction type is gaming is True | Allow |
| India | Transaction type is gambling | Transaction type | Transaction type is gaming is True | Deny |
| India | ATO model score | Max ATO model score limit | ATO model score < 800 | Allow |

An output rule for a region corresponding to India by policy computation 212 may correspond to "Country is India; if transaction type is gambling is True or (ATO model score >800) and transaction amount is ≥₹ 50000; then: decline transaction."

Figure 3:
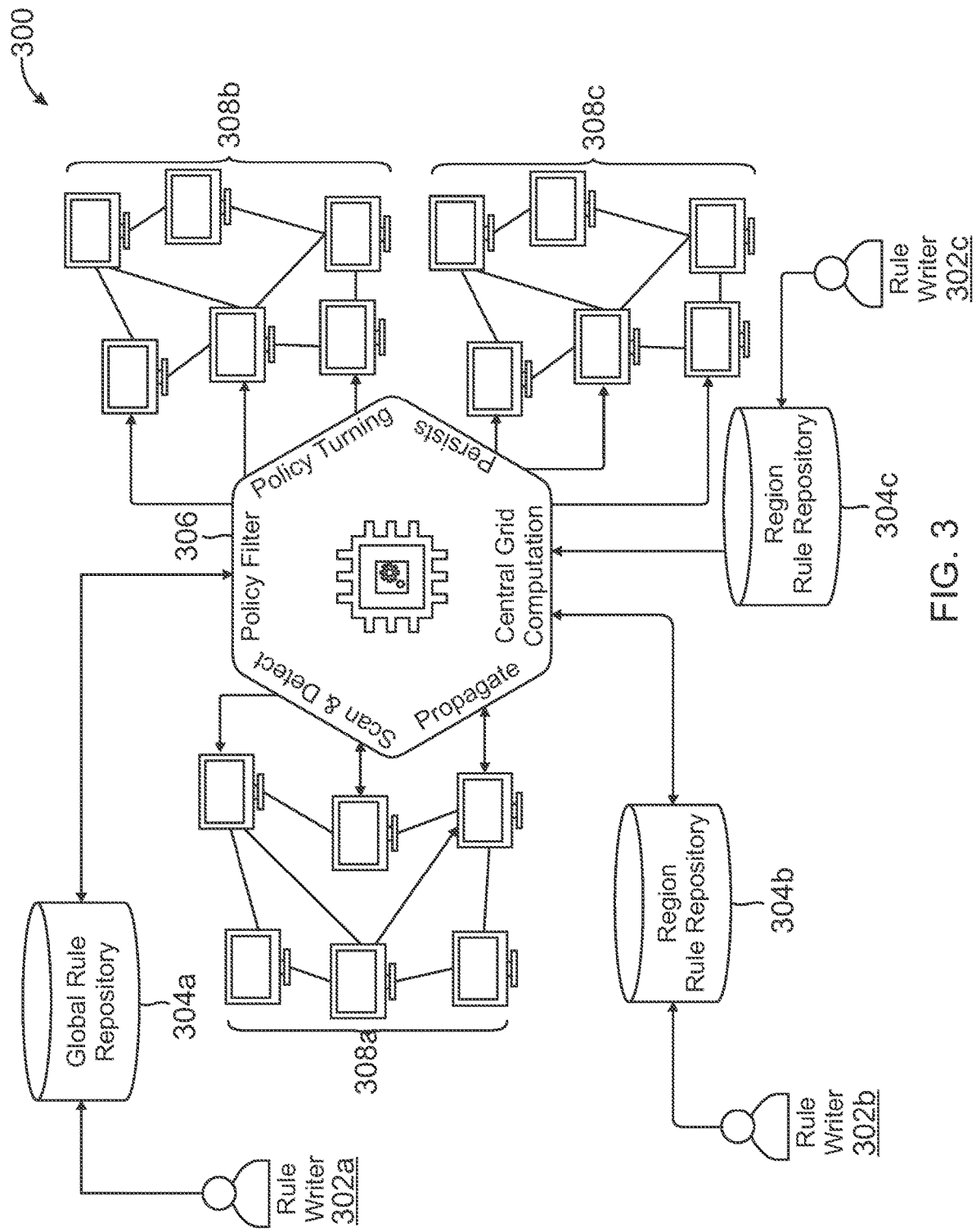
FIG. 3 is an exemplary diagram of automatically tuned rules for data processing when deployed in different regions based on region-specific policies and requirements, according to an embodiment.

FIG. 3 is an exemplary diagram 300 of automatically tuned rules for data processing when deployed in different regions based on region-specific policies and requirements, according to an embodiment. Diagram 300 includes operations performed by a central grid computation 306 that may be executed by rule authoring platform 140 discussed in reference to system 100 of FIG. 1, such as when adjusting, tuning, and/or optimizing rules and strategies for deployment in new and/or different regions. In this regard, central grid computation 306 may perform operations to configure rules and/or rule strategies written and/or provided by rule writers 302*a*, 302*b*, and 302*c*, such as using the operations, processes, and features described by central grid computation 206 and the other components in system environment 200 of FIG. 2.

In diagram 300, rule writers 302*a-c* may write, generate, code, and/or otherwise develop rules for global rule repositories 304*a* and/or region rule repositories 304*b* and 304*c*. Each of rule repositories 304*a-c* may persist rules and/or rule strategies used for decision-making by one or more decision services for regions 308*a*, 308*b*, and 308*c*, respectively. However, during use of decision services and/or other intelligent decision-making engines, a rule or strategy being used in one of regions 308*a-c* may be required to be propagated from its corresponding one of regions 308*a-c* to another one of regions 308*a-c*. For example, a rule and/or strategy may initial be written by rule writer 302*a* for global rule repository 304*a* and be propagated to global rule repository 304*a*. However, at the same time or a later time, it may be determined that the rule and/or strategy requires propagation in regions 308*b* and 308*c*. This may occur when use of the rule and/or strategy may be required by decision services in those corresponding regions 308*b* and 308*c*.

Thus, central grid computation 306 may perform adjustment, tuning, and/or optimization of a rule or strategy, such as a "global" rule or strategy, from global rule repository 304a for persistence as a region-specific rule or strategy in region rule repository 304b and 304c. In this regard, central grid computation 306 may access or receive the rule or strategy from global rule repository 304a. Thereafter, region-specific policies for regions 308b and 308c may be accessed from one or more policy repositories for the corresponding region. Comparison and/or matching of variables, condition types, and/or conditions may then be performed in order to tune the rule and/or strategy to be compatible with the policies for the corresponding region. Once changes are identified, the rule and/or strategy may be adjusted, tuned, and/or optimized, and the corresponding result may be persisted in region rule repository 304b and 304c. This allows one or more decision services, rule-based engines, and/or the like to access and/or utilize the rule during intelligent decision-making.

Figure 4:
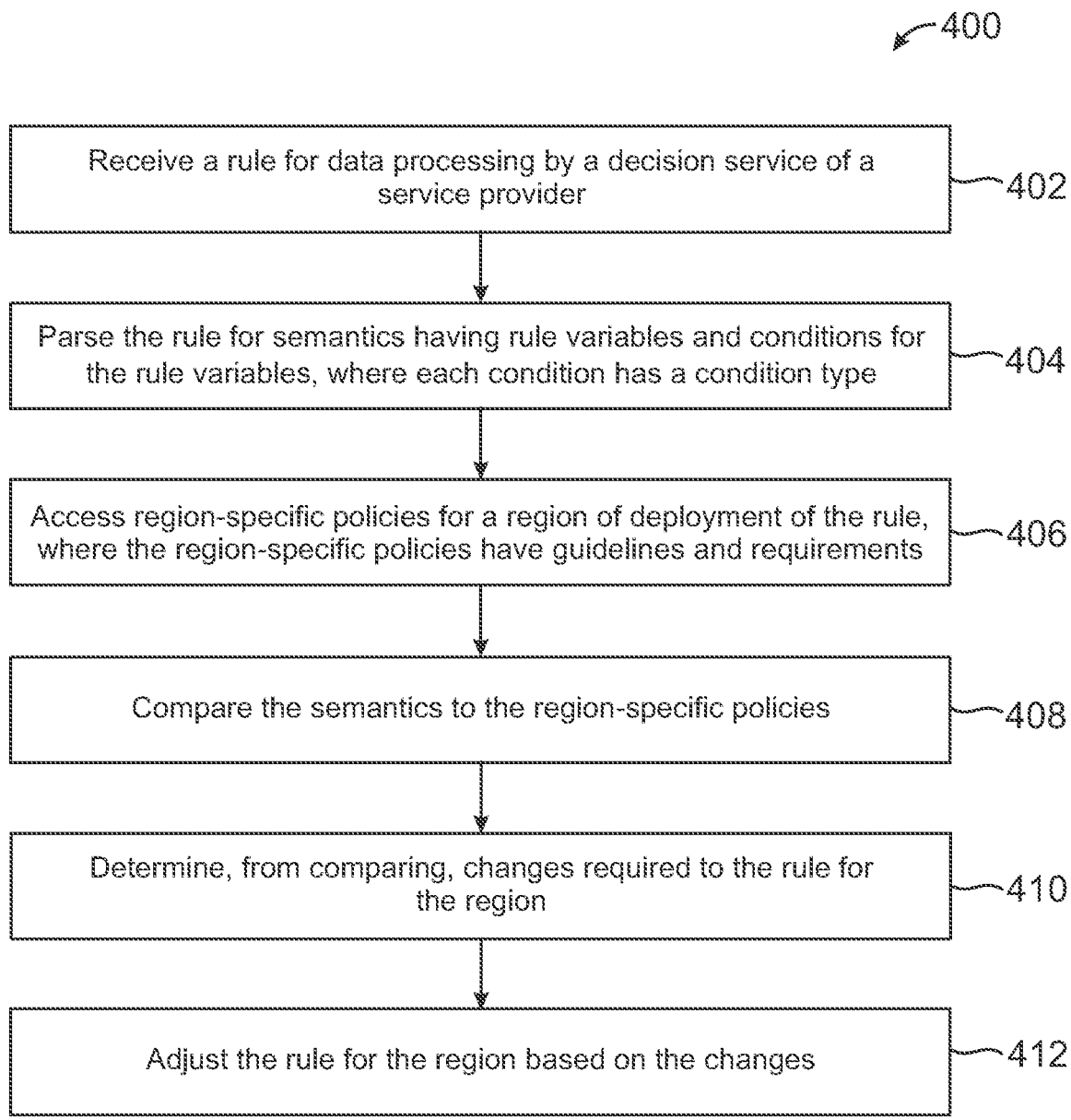
FIG. 4 is a flowchart of an exemplary process for automated tuning of data processing rules based on region-specific requirements, according to an embodiment.

FIG. 4 is a flowchart 400 of an exemplary process for automated tuning of data processing rules based on region-specific requirements, according to an embodiment. Note that one or more steps, processes, and methods described herein of flowchart 400 may be omitted, performed in a different sequence, or combined as desired or appropriate.

At step 402 of flowchart 400, a rule is received for data processing by a decision service of a service provider. The rule may also correspond to a strategy, which may utilize multiple sub-rules, variables, and/or conditions. The rule and/or strategy may correspond to an executable operation to cause a decision service to provide an output decision, score, or the like. For example, the rule may be used to determine whether or not to take an action as the result of an input request or other data.

At step 404, the rule is parsed for semantics having rule variables and conditions for the rule variables, where each condition has a condition type. When parsing and/or filtering the rule and/or rule strategy, the processing logic of a sematic processor may determine and/or define one or more variables, types of conditions, and then conditions within the rule. This may allow for generation of a data structure, such as a data table, which may include, for a region, the rule or rule strategies variable(s), condition type(s), and condition(s). The data structure may then be provided as an output in order for determination of adjustments to the rule for specific regions.

At step 406, region-specific policies are accessed for a region of deployment of the rule, where the region-specific policies have guidelines, best practices, and/or requirements. Region-specific policies may be established by one or more policy owners or writers for the specific region, and may be used to enforce different requirements, best practices, and/or guidelines for the specific region. Thereafter, the region-specific policies may be stored to a policy data repository for the region, from which, a grid computation module may access in order to analyze the semantic data structure of the rule. One or more data structures, such as data tables, may also be provided for the policies, which may include columns for different rule components (e.g., region, variables, condition types, conditions, rule actions, etc.) that may be used for comparing and/or matching to the semantic data structure.

At step 408, the semantics are compared to the region-specific policies. When comparing the semantics to the region-specific policies, the corresponding data structures may be used for matching. This may allow a policy computation to determine any matches between variables and condition types in a rule, and thereafter determine required changes to the rule's conditions and/or actions in order to configure the rule to the specific region. In some embodiments, policies may only have condition types and conditions, where variables may not be required for matching.

At step 410, changes, from comparing the semantics to the region-specific policies, that are required to the rule are determined for the region. The changes may be based on the comparing and may configure the rule for the specific region based on the region-specific policies for requirements, best practices, and guidelines of rules that are deployed in that region. This may include adjusting or changing any conditions and/or actions of the rule based on those conditions. For example, a setting, threshold, or value may be changed for a setting based on the region-specific policies in order to comply with region-specific rule outputs or actions. At step 412, the rule is adjusted for the region based on the changes. Once the rule is adjusted, the rule may be persisted to a rule repository for the region, from which, decision services, rule-based engines, and the like may utilize the rule for intelligent decision-making.

Figure 5:
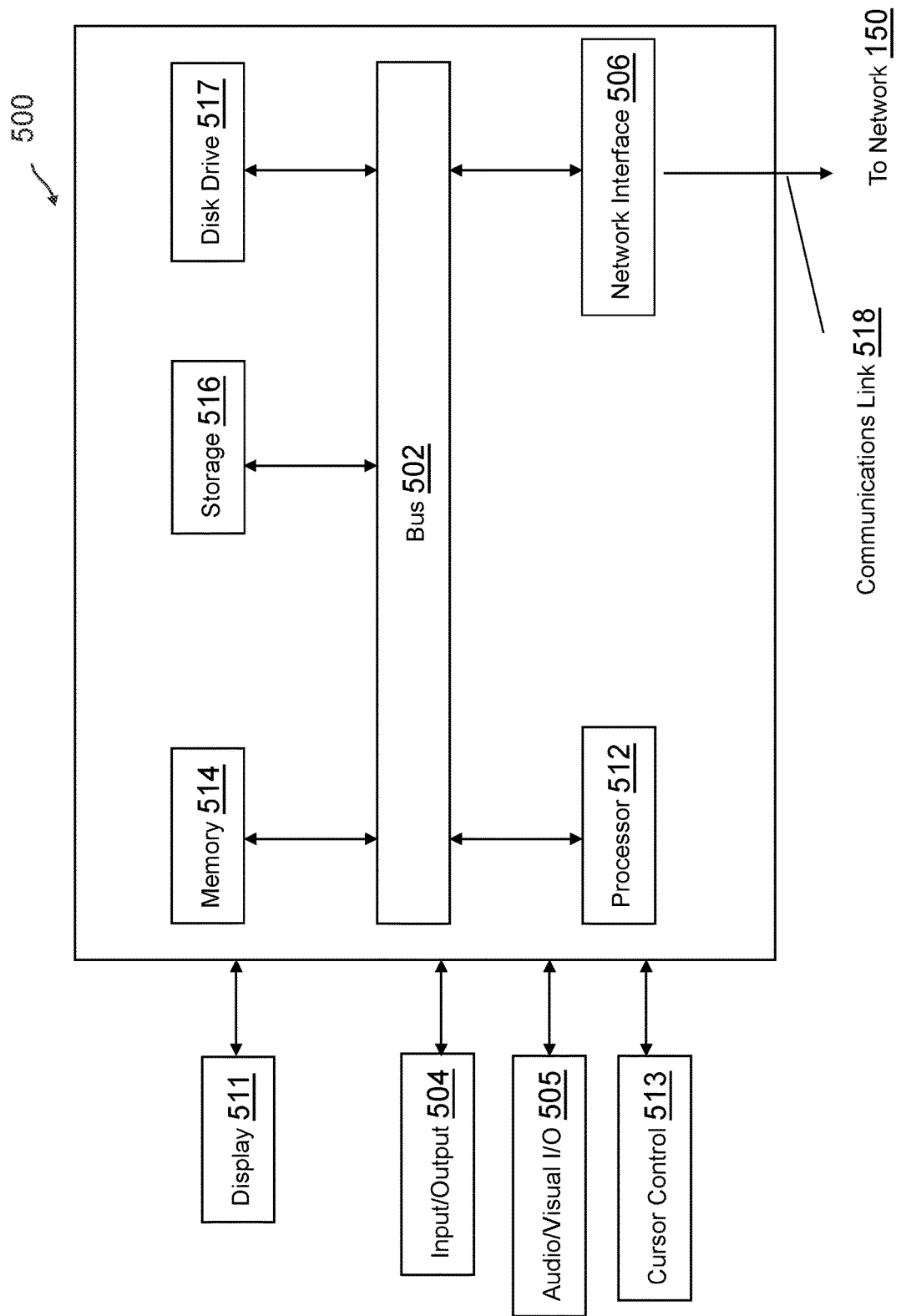
FIG. 5 is a block diagram of a computer system suitable for implementing one or more components in FIG. 1, according to an embodiment.

FIG. 5 is a block diagram of a computer system 500 suitable for implementing one or more components in FIG. 1, according to an embodiment. In various embodiments, the communication device may comprise a personal computing device e.g., smart phone, a computing tablet, a personal computer, laptop, a wearable computing device such as glasses or a watch, Bluetooth device, key FOB, badge, etc.) capable of communicating with the network. The service provider may utilize a network computing device (e.g., a network server) capable of communicating with the network. It should be appreciated that each of the devices utilized by users and service providers may be implemented as computer system 500 in a manner as follows.

Computer system 500 includes a bus 502 or other communication mechanism for communicating information data, signals, and information between various components of computer system 500. Components include an input/output (I/O) component 504 that processes a user action, such as selecting keys from a keypad/keyboard, selecting one or more buttons, image, or links, and/or moving one or more images, etc., and sends a corresponding signal to bus 502. I/O component 504 may also include an output component, such as a display 511 and a cursor control 513 (such as a keyboard, keypad, mouse, etc.). An optional audio input/output component 505 may also be included to allow a user to use voice for inputting information by converting audio signals. Audio I/O component 505 may allow the user to hear audio. A transceiver or network interface 506 transmits and receives signals between computer system 500 and other devices, such as another communication device, service device, or a service provider server via network 150. In one embodiment, the transmission is wireless, although other transmission mediums and methods may also be suitable. One or more processors 512, which can be a micro-controller, digital signal processor (DSP), or other processing component, processes these various signals, such as for display on computer system 500 or transmission to other devices via a communication link 518. Processor(s) 512 may also control transmission of information, such as cookies or IP addresses, to other devices.

Components of computer system 500 also include a system memory component 514 (e.g., RAM), a static storage component 516 (e.g., ROM), and/or a disk drive 517. Computer system 500 performs specific operations by processor(s) 512 and other components by executing one or more sequences of instructions contained in system memory component 514. Logic may be encoded in a computer readable medium, which may refer to any medium that participates in providing instructions to processor(s) 512 for execution. Such a medium may take many forms, including but not limited to, non-volatile media, volatile media, and transmission media. In various embodiments, non-volatile media includes optical or magnetic disks, volatile media includes dynamic memory, such as system memory component 514, and transmission media includes coaxial cables, copper wire, and fiber optics, including wires that comprise bus 502. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 500. In various other embodiments of the present disclosure, a plurality of computer systems 500 coupled by communication link 518 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A system comprising:
   a non-transitory memory; and
   one or more hardware processors coupled to the non-transitory memory and configured to read instructions from the non-transitory memory to cause the system to perform operations comprising:
      accessing a data processing strategy having at least one rule for a data processing operation associated with an online digital platform of a service provider, wherein the data processing strategy is implemented in a data processing decision service in a first region;
      propagating the data processing strategy from the data processing decision service for the first region to one or more data processing decision services for a second region;
      determining semantics of the data processing strategy using a semantic processing operation, wherein the semantic processing operation is associated with a rule authorizing application for the at least one rule of the data processing strategy, and wherein the semantics comprise at least one variable in the at least one rule and a condition for the at least one rule;
      comparing the semantics of the data processing strategy to one or more policies for the second region;
      determining at least one change to the data processing strategy based on the comparing; and
      adjusting the data processing strategy for the one or more data processing decision services the second region based on the at least one change.

2. The system of claim 1, wherein the determining the semantics comprises:
   parsing the at least one rule for the data processing strategy using coded variables for the rule authorizing application; and
   filtering the at least one variable and the condition based on the parsing.

3. The system of claim 1, wherein the determining the semantics comprises:
   identifying newly added changes to a plurality of rules for the second region in the one or more data processing decision services for the second region.

4. The system of claim 1, where the condition comprises a condition type, and wherein the determining the semantics comprises determining the condition type for the at least one variable.

5. The system of claim 1, wherein the at least one variable is encoded as computing code having data processing logic associated with a business rule for electronic transaction processing.

6. The system of claim 1, wherein the condition comprises a data processing predicate that identifies an action executable by the at least one variable in the at least one rule.

7. The system of claim 1, wherein the rule authoring application comprises a software application executable with the system that enables coding of the at least one rule for the data processing strategy when deployed in the one or more decision services for the second region.

8. The system of claim 1, wherein the comparing comprises executing a grid computation module having the semantic processing operation for tuning the data processing strategy for the second region based on a data repository comprising the one or more policies for the second region.

9. The system of claim 8, wherein, prior to the accessing the data processing strategy, the operations further comprise:

receiving the data processing strategy generated using the rule authorizing application by a user for the first region; and receiving a designation to deploy the data processing strategy from the first region to the second region for the adjusting the data processing strategy, wherein the propagating is performed in response to the designation.

10. The system of claim 9, wherein the first region comprises one of a selected main region of the service provider or a global region selected for deployment to a plurality of regions including the second region.

11. A method comprising:

determining a first region of a deployment of a data package for a data processing rule strategy for a first decision service associated with the first region, wherein the first decision service provides automated decision-making for a computing service, and wherein the data processing rule strategy is implemented in a second decision service;

filtering the data package for the data processing rule strategy that is to be deployed in the first region;

identifying, based on the filtered data package for the data processing rule strategy, one or more changes to a plurality of rules for one or more data processing rule strategies in the first region;

adjusting the plurality of rules for the first region based on the identified one or more changes and one or more region-specific guidelines for the first region; and propagating the plurality of adjusted rules for the first region in one or more data processing rule repositories for the first region.

12. The method of claim 11, wherein the data package for the data processing rule strategy was previously deployed in the second decision service associated with a second region for the automated decision-making for the computing service, and wherein the propagating the data package is in response to a request to deploy the data processing rule strategy in the first decision service associated with the first region.

13. The method of claim 12, wherein prior to the determining the first region, the method further comprises:

cloning the data package from the second decision service associated with the second region.

14. The method of claim 11, further comprising:

executing the plurality of adjusted rules with a first decision service during electronic transaction processing for the computing service occurring in the first region.

15. The method of claim 11, wherein the identifying the one or more changes to the plurality of rules utilizes a machine learning model trained for policy computation and policy identification for the first region.

16. The method of claim 11, wherein the propagating the plurality of adjusted rules for the first region in one or more data processing rule repositories comprises overwriting the plurality of adjusted rules to the one or more data processing rule repositories for a decision service in place of one or more other rules for the decision service.

17. The method of claim 11, wherein the filtering the data package comprises executing a sematic processor to generate a semantic output data structure for the data processing rule strategy.

18. The method of claim 17, wherein the semantic output data structure comprises a data table having a plurality of columns, and wherein the plurality of columns comprises at least one of a variable, a rule predicate type, a rule predicate, or an outcome of the rule predicate.

19. A non-transitory machine-readable medium having stored thereon machine-readable instructions executable to cause a machine to perform operations comprising:

receiving a rule strategy comprising at least one data processing rule utilized by at least one decision service for a service provider in a region;

determining, using a rule authorizing application for the at least one data processing rule, one or more rule semantics and one or more conditions for the data processing rule, wherein the one or more rule semantics and the one or more conditions comprise coded operations for execution of the rule strategy for the at least one decision service for the region;

comparing the one or more rule semantics and the one or more conditions to one or more rule policies coded for the region;

adjusting the one or more rule semantics and the one or more conditions for the rule strategy based on the comparing; and deploying the rule strategy having the adjusted one or more rule semantics and the adjusted one or more conditions.

20. The non-transitory machine-readable medium of claim 19, wherein the operations further comprise:

utilizing the rule strategy with at least one electronic transaction processing operation in the region.

* * * * *